Jan. 19, 1971     G. R. QUICK     3,555,790
AERODYNAMIC GRAIN HANDLING SYSTEM
Filed Aug. 5, 1968
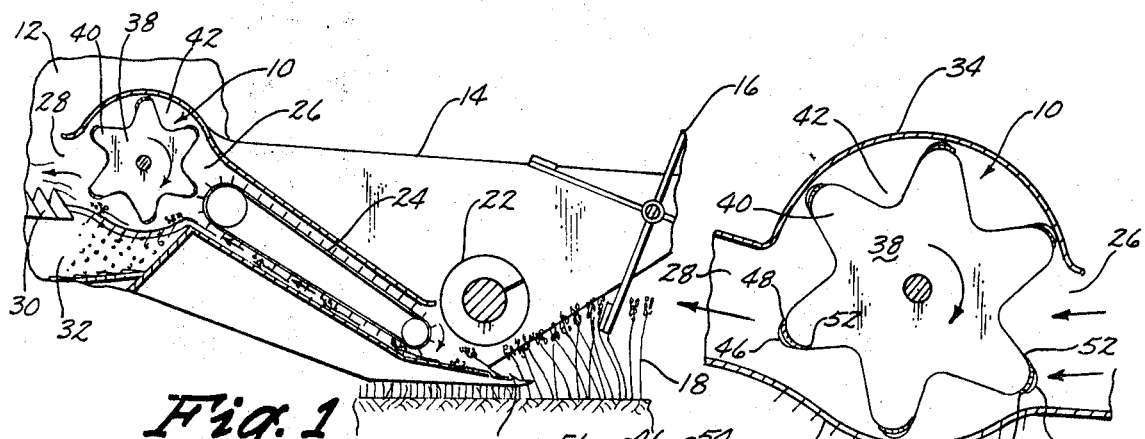
Fig. 1
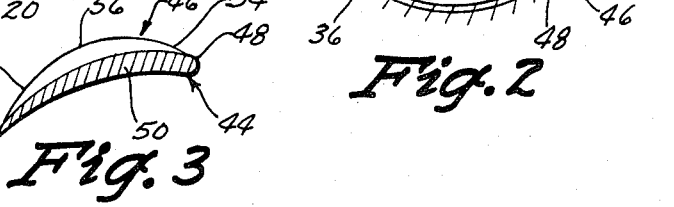
Fig. 2
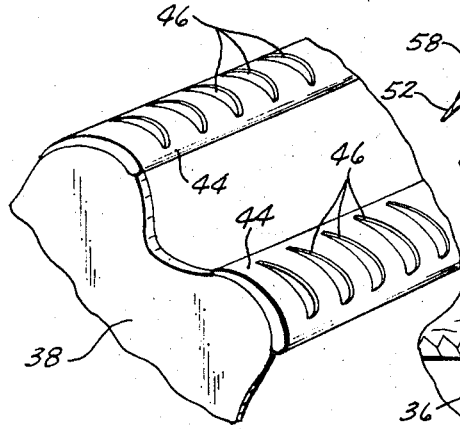
Fig. 3    Fig. 4
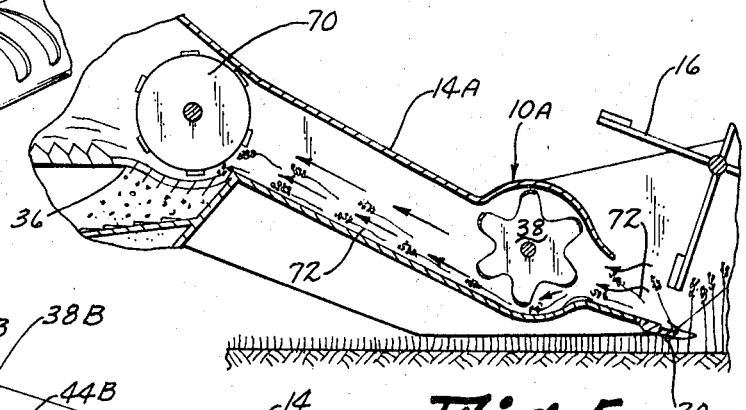
Fig. 5
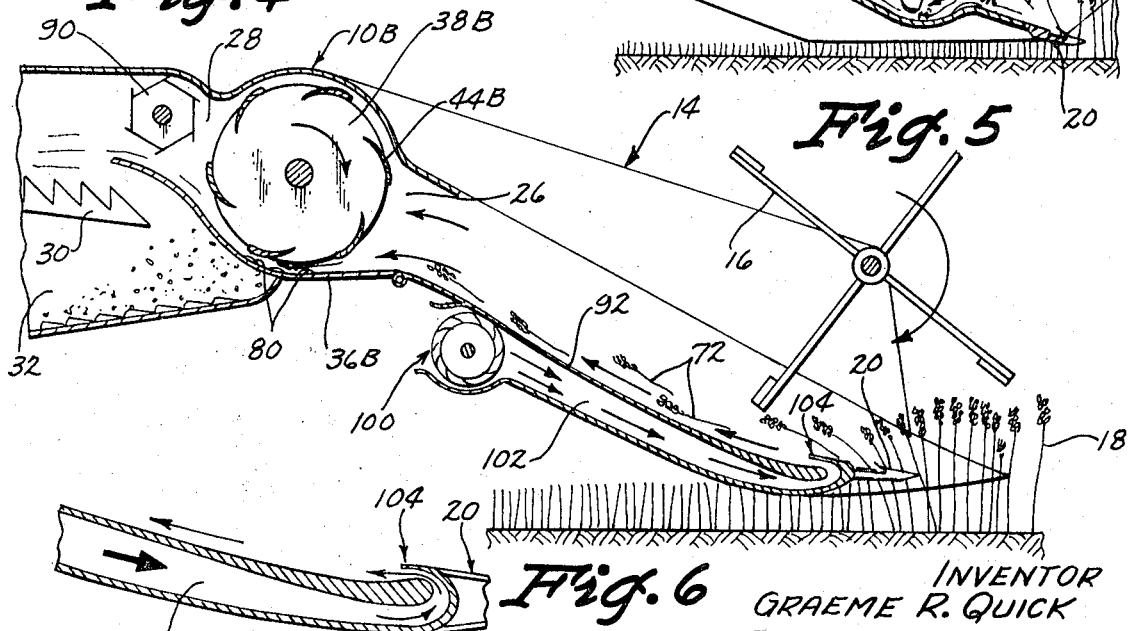
Fig. 6
Fig. 7
INVENTOR
GRAEME R. QUICK
BY
Zarley, McKee & Thomte
ATTORNEYS United States Patent Office 3,555,790
Patented Jan. 19, 1971

3,555,790
AERODYNAMIC GRAIN HANDLING SYSTEM
Graeme R. Quick, Ames, Iowa, assignor to Iowa State University Research Foundation, Ames, Iowa, a corporation of Iowa
Filed Aug. 5, 1968, Ser. No. 750,158
Int. Cl. A01d 41/10
U.S. Cl. 56—21                    8 Claims

ABSTRACT OF THE DISCLOSURE

A device for accelerating the movement of grain from the pickup unit on a combine to the threshing cylinder and therethrough wherein forced air is employed and the threshing cylinder includes aerodynamic bars which function to draw the material into the cylinder and blow the material therefrom while performing the threshing operation. A source of air may be placed under the header to direct air through a return venturi duct onto the grain moving up the header platform towards the threshing cylinder.

The threshing cylinders conventionally used function only to perform the threshing operation and do little to move the grain therethrough or to draw the grain into the threshing cylinder or to forcibly eject it therefrom. Consequently the threshing cylinder will frequently become choked and require cleaning for it to return to normal operation. Furthermore, numerous mechanical conveying devices have been employed for moving the grain from the cutting means on the header to the threshing cylinder but these are all relatively slow and inefficient and are subject to the usual mechanical breakdown.

This invention incorporates into the threshing cylinder aerodynamic bars having an airfoil cross-section wherein the aerodynamic bars also perform the thresher bar function of the threshing cylinder. The aerodynamic threshing cylinder thus provides positive conveying action which is not possible with conventional threshing cylinders. The separate conveyors at the inlet and outlet of the threshing cylinder may possibly be eliminated due to the substantial suction developed at the inlet and the substantial discharge pressure at the outlet of the threshing cylinder. Accordingly the threshing cylinder of this invention provides a self-feeding action because of the suction and eliminates the need of special equipment such as beaters required in some conventional threshing cylinders to assure that the grain goes into a threshing cylinder in the correct manner.

The threshing cylinder of this invention is also self-cleaning because of the blast of air developed at the outlet and suction at the inlet for moving grain and foreign material through the threshing cylinder.

The conventional combine header elevator from the windrow pickup unit or the sickle blades may be eliminated particularly when the forced air fan is employed directing air onto the grain for assisting in forcing it towards the inlet of the threshing cylinder of this invention which develops substantial suction at the inlet.

The threshing cylinder of this invention draws only from the inlet opening which is positioned perpendicularly to the axis of rotation and thus does not draw any air from opposite ends of the threshing cylinder. The air drawn into the cylinder is air associated with the grain being worked upon and thus assists in moving the grain into the cylinder.

These and other features and advantages of this invention will become readily apparent to those skilled in the art upon reference to the following description when taken into consideration with the accompanying drawings wherein:

FIG. 1 is a side cross-sectional view of a combine header employing the thresher cylinder of this invention;

FIG. 2 is an enlarged side cross-sectional view of the threshing cylinder only and illustrates the profile of the aerodynamic blades and thresher bars;

FIG. 3 is a cross-sectional view of the aerodynamic blades and thresher bars only;

FIG. 4 is a fragmentary perspective view of the periphery of the threshing cylinder to illustrate the aerodynamic blades and thresher bars thereon;

FIG. 5 is a cross-sectional view of a combine employing the thresher cylinder closely adjacent the pickup means on the header for feeding grain to a conventional threshing cylinder at the rear end of the header;

FIG. 6 is a cross-sectional view of a combine header employing the threshing cylinder of this invention in combination with a forced air fan directing air through a venturi duct along the header platform towards the threshing cylinder and thus providing an air elevator; and FIG. 7 is an enlarged side cross-sectional view of the venturi duct employed in the forced air elevator as shown in FIG. 6.

The aerodynamic threshing cylinder of this invention is referred to generally in FIG. 1 by the reference numeral 10 and is shown on a combine 12 having a header 14. A reel 16 is provided for moving the standing grain 18 into the sickle bar cutters 20 where it is then moved by left and right augers 22 to the center of the header for pickup by a header elevator 24 which feeds the inlet 26 of the threshing cylinder 10. The threshing cylinder 10 includes an outlet opening 28 from which the grain moves onto shakers 30 and into separating and cleaning section 32.

An enclosure is provided for the threshing cylinder 10 and includes top and bottom arcuate walls 34 and 36 which have inside faces closely adjacent the peripheral edges of the rotatable cylinder 38. As illustrated the cylinder 38 includes a plurality of peripherally spaced apart ridges and grooves 40 and 42 respectively. Each of the ridges carries a threshing bar 44 having a series of longitudinally spaced apart blades 46. As seen in FIG. 3 the threshing bars 44 and the blades 46 present an airfoil cross-section and profile including a rounded convex leading edge 48, a body portion 50 and a trailing reduced in thickness edge 52. The blades correspond in cross-section to the thresher bar 44 and thus have a forward leading edge 54, an intermediate body portion 56 and a reduced in thickness trailing edge 58. It is seen that the cross-section in FIG. 3 is convex outwardly with the trailing edge 52 of the thresher bar being positioned radially inwardly on the cylinder 38 from the leading outwardly positioned edge 48 (FIG. 2).

Thus it is seen that the grain moves from right to left through the cylinder 38 over the bottom wall 36 which functions as the concave of the threshing cylinder unit 10. The concave 36 and the top wall 34 fitting closely onto the cylinder 38 insures the development of the desired suction at the inlet 26 and the air blast at the outlet 28 as well as the desired threshing operation between the threshing bars 52 and the concave 56.

As seen in FIG. 5, the conventional threshing cylinder unit 70 is employed in conjunction with a concave 36 at the top of the header 14A and is fed the stalks of grain by the blast of air developed by the cylinder unit 10A being located down adjacent the sickle unit 20. Accordingly, the cylinder 38 functions to draw the cut crop 72 into the cylinder 38 and forcibly eject it outwardly and upwardly towards the conventional threshing cylinder 70 and thus eliminate need for the conveyor 24 in FIG. 1. The desired threshing action may be provided for in the cylinder 10A as resired to supplement the action of the threshing cylinder 70.

In FIGS. 6 and 7 the cylinder unit 10B includes a cylinder 38B having spaced apart peripherally positioned threshing bars 44B with airfoil profiles which function in cooperation with rasp elements 80 on the inside surface of the concave 36B. These elements 80 perform the function of the blades 46 carried on the bars 44 as seen in FIG. 3. The fresh crop is discharged from the cylinder 38 out through an outlet 28 to the shaker 30 and the separating and cleaning 32 past beater 90.

The header 14 includes a smooth platform 92 interconnecting the cylinder unit 10B with the cutting sickle section 20 under the combine reel 16. The standing crop 18 is thus cut by the cycle section 20 and falls onto the platform 92 for being conveyed to the threshing cylinder unit 10B. A forced air cross current type fan 100 is provided under the platform 92 and directs air through a passageway 102 forwardly along the platform through a venturi duct 104 adjacent the sickle section 20 which directs the air rearwardly and upwardly along the platform 92 to provide an air elevator for the cut grain 72. Accordingly it is seen that the conventional conveyor 24 of FIG. 1 is completely eliminated by use of the air elevator and the threshing cylinder 10B which develops tremendous suction. It is seen that a straight through movement for the grain is provided with a maximum of speed and a minimum number of moving parts being required.

Some changes may be made in the construction and arrangement of my aerodynamic grain handling system without departing from the real spirit and purpose of my invention, and it is my intention to cover by my claims, any modified forms of structure or use of mechanical equivalents which may be reasonably included within their scope.

I claim:
1. A grain handling system, comprising,
a rotatable cylinder in a chamber having a grain inlet and a grain outlet oriented along a line perpendicular to the axis of rotation of said cylinder,
aerodynamic bars on the periphery of said cylinder to draw grain into said cylinder at said inlet and discharge it at said outlet whereby said grain is discharged at a substantial increase in speed over the speed of said grain in the inlet of said chamber prior to being acted upon by said action of said cylinder,
said cylinder and chamber being designed such that material and air are drawn into said cylinder substantially only through said inlet,
said bars having a knife-shaped forward leading edge which merges rearwardly into a thicker body portion and terminates in a trailing edge relatively thinner than said body portion.

2. The structure of claim 1 wherein said bars are curved in longitudinal cross-section and have an outer convex surface.

3. The structure of claim 2 wherein said trailing edge of each of said bars extends radially inwardly on said cylinders and terminates at a point substantially closer to said axis of cylinder rotation than said leading forward edge.

4. The structure of claim 3 wherein said bars have upstanding blades spaced apart along their length and said blades have a profile similar to the cross-sectional profile of said bars.

5. The structure of claim 3 wherein chamber includes relatively close fitting side walls to the periphery of said cylinder and closely adjacent said bars for threshing of said grain passing between the outer peripheral edge of said cylinder and said adjacent chamber side wall.

6. The structure of claim 5 wherein said cylinder is positioned on a combine and said inlet is in communication with the header of said combine and the outlet of said chamber is in communication with the separating and cleaning section of said combine.

7. The structure of claim 6 wherein said header includes grain pickup means at the forward end thereof remote from said cylinder, and a source of forced air is directed towards said cylinder between said cylinder and said pickup means for moving said grain to said cylinder.

8. The structure of claim 7 wherein said header includes a platform extending between said pickup means and said cylinder, and a forced air fan is positioned under said platform in communication with a passageway extending underside platform forwardly and up through said platform and rearwardly therealong towards said cylinder for air to move said grain towards said cylinder, and a venturi duct is located in said platform at the point said passageway extends therethrough for directing air rearwardly therealong against said grain.

References Cited

UNITED STATES PATENTS

| | | | |
|---|---|---|---|
| 1,146,785 | 7/1915 | Colahan | 56—21 |
| 1,739,380 | 12/1929 | White | 130—27.8F |
| 2,796,868 | 6/1957 | Oliver | 130—27.85 |
| 3,212,243 | 10/1965 | Mark et al. | 130—27.8 |

ANTONIO F. GUIDA, Primary Examiner

U.S. Cl. X.R.

130—27